Figure 1:
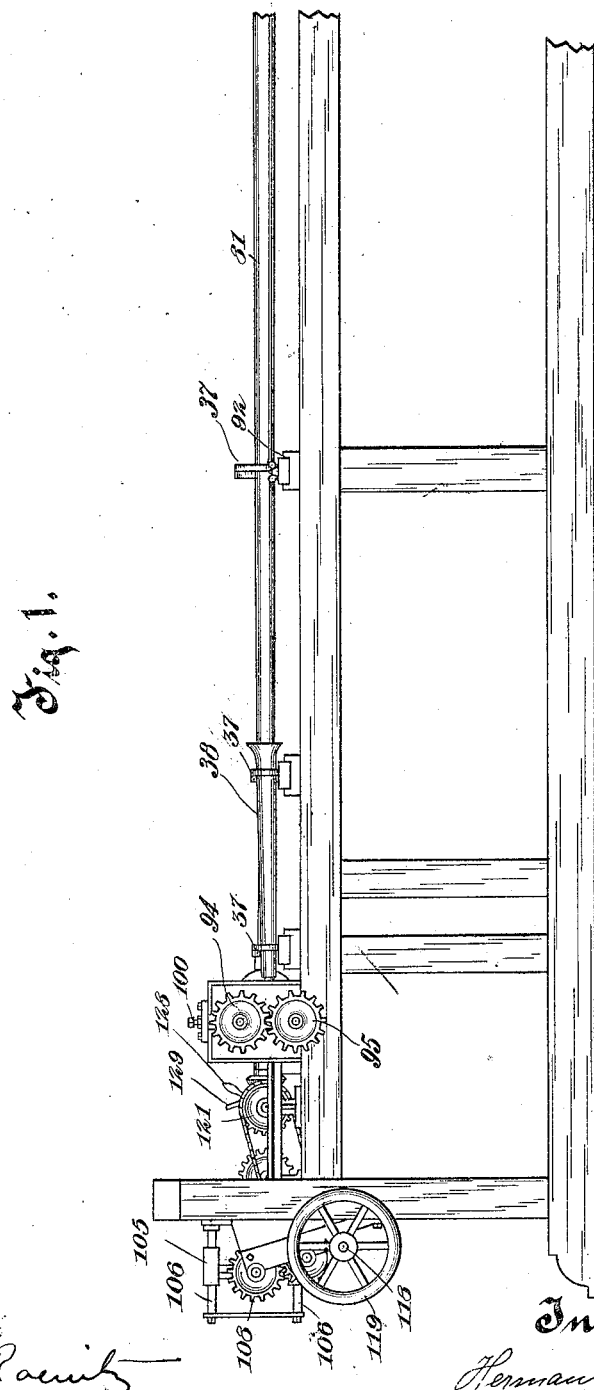

No. 887,250. PATENTED MAY 12, 1908.
H. HAYSSEN.
APPARATUS FOR THE MANUFACTURE OF PACKING PADS.
APPLICATION FILED JAN. 11, 1905.

10 SHEETS—SHEET 1.

No. 887,250. PATENTED MAY 12, 1908.
H. HAYSSEN.
APPARATUS FOR THE MANUFACTURE OF PACKING PADS.
APPLICATION FILED JAN. 11, 1905.
10 SHEETS—SHEET 2.

No. 887,250. PATENTED MAY 12, 1908.
H. HAYSSEN.
APPARATUS FOR THE MANUFACTURE OF PACKING PADS.
APPLICATION FILED JAN. 11, 1905.

10 SHEETS—SHEET 7.

Witnesses.
Inventor.
Herman Hayssen.
By
Attorney.

No. 887,250. PATENTED MAY 12, 1908.
H. HAYSSEN.
APPARATUS FOR THE MANUFACTURE OF PACKING PADS.
APPLICATION FILED JAN. 11, 1905.

10 SHEETS—SHEET 8.

Witnesses.
William P. Roentz
C. H. McConnell

Inventor.
Herman Hayssen.
By Jno. S. Grimm
Attorney.

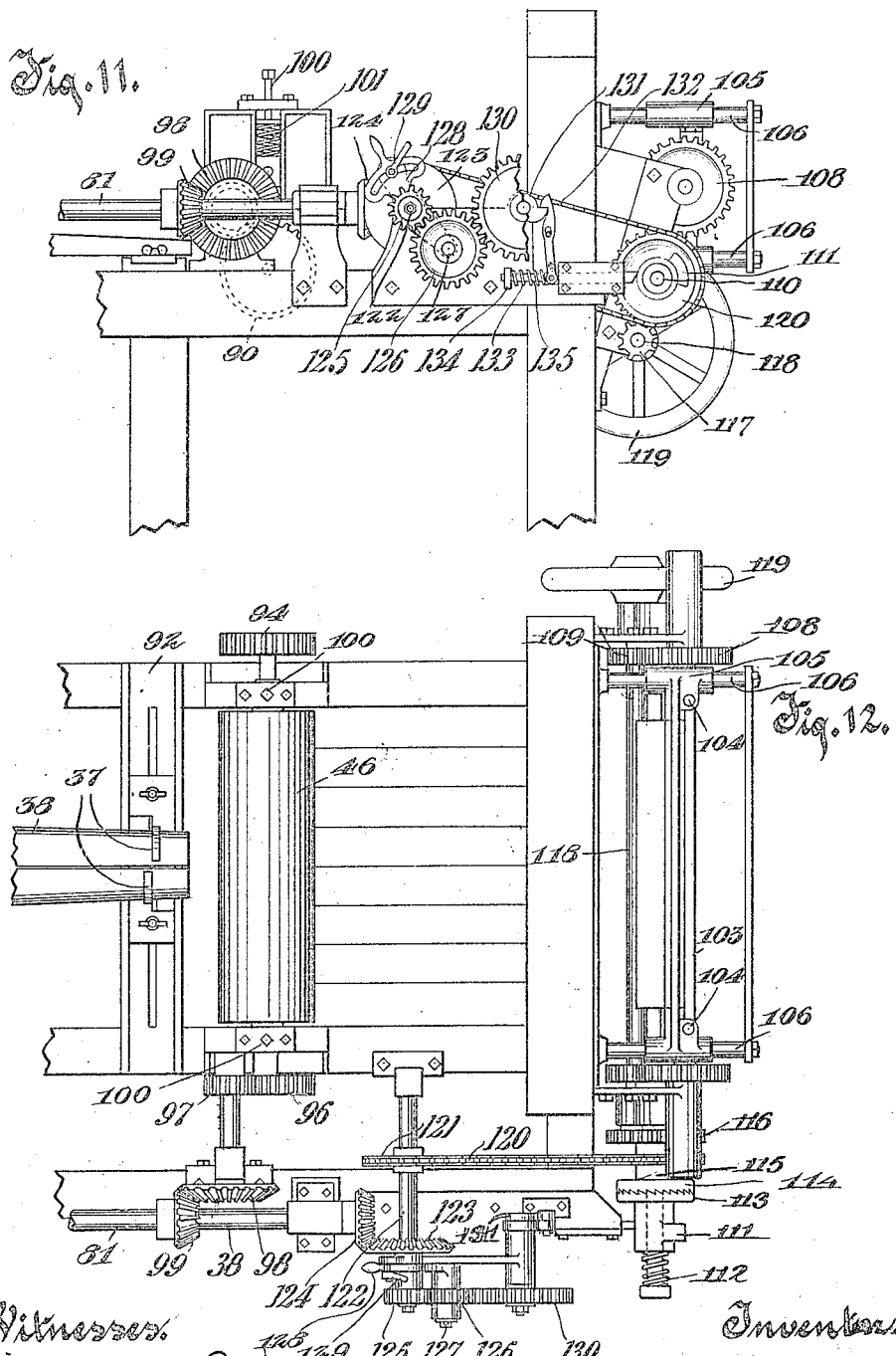

No. 887,250. PATENTED MAY 12, 1908.
H. HAYSSEN.
APPARATUS FOR THE MANUFACTURE OF PACKING PADS.
APPLICATION FILED JAN. 11, 1905.
10 SHEETS—SHEET 10.
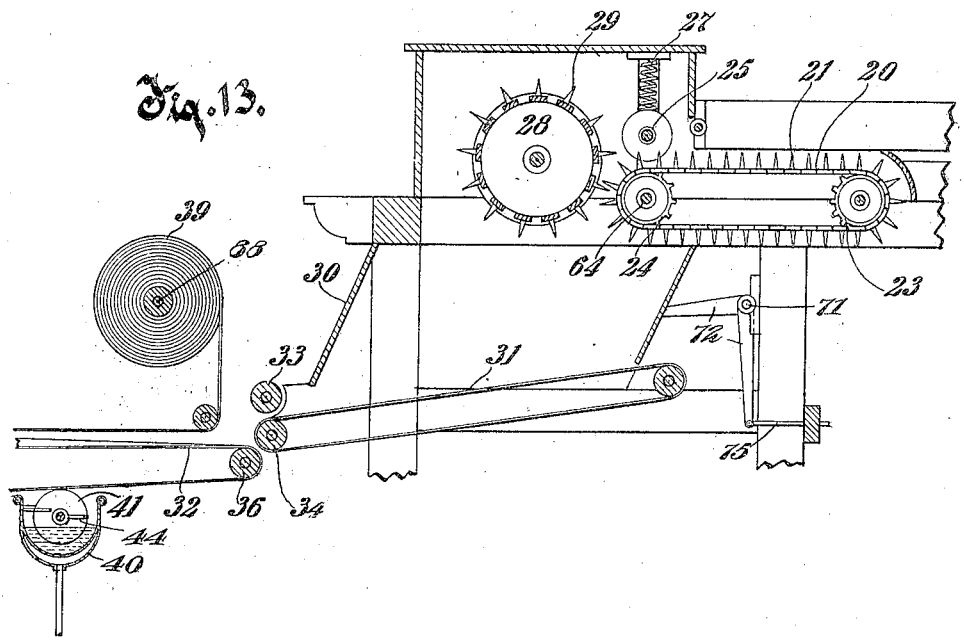
   
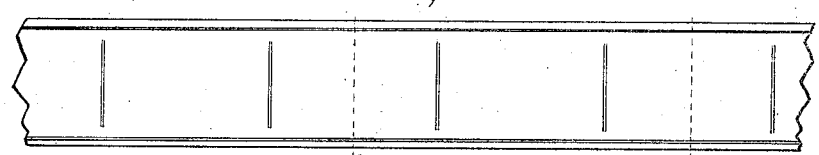
 

UNITED STATES PATENT OFFICE.

HERMAN HAYSSEN, OF SHEBOYGAN, WISCONSIN, ASSIGNOR TO EXCELSIOR WRAPPER COMPANY, OF SHEBOYGAN, WISCONSIN.

APPARATUS FOR THE MANUFACTURE OF PACKING-PADS.

No. 887,250.　　　Specification of Letters Patent.　　　Patented May 12, 1908.

Application filed January 11, 1905. Serial No. 240,593.

*To all whom it may concern:*

Be it known that I, HERMAN HAYSSEN, a citizen of the United States, and a resident of Sheboygan, in the county of Sheboygan and State of Wisconsin, have invented a new and useful Improvement in Apparatus for the Manufacture of Packing-Pads, of which the following is a specification.

This invention relates to apparatus or machines for use in the manufacture of pads or wrappers for packing purposes.

Pads or wrappers for packing purposes, consisting of a casing or jacket filled with excelsior or similar fibrous material, such as marsh hay or sea-moss, have, within the last few years come into wide use, and one form of the same, commonly known as an excelsior bottle wrapper, consists of two concentrically arranged cylindrical cases or envelops having a layer of the fibrous material interposed there between, while the other is known as an excelsior packing pad, and consists of an open ended case or jacket filled or stuffed with the fibrous material. The bottle wrappers are placed over and around the bottles packed, and form a yielding jacket. The pads are used for various purposes, and probably most widely for packing furniture. From the uses to which these wrappers and pads are put, it is necessary that the cost of manufacture is brought down to the lowest possible point, and one object of this invention has been to produce an apparatus or machine by means of which pads or wrappers, as above outlined, may be easily and rapidly manufactured at low cost.

A further object of this invention has been to produce a simple machine for the production of such pads in which all of the parts thereof are readily accessible; a machine which is automatic, as hereinafter described, and which may be quickly and readily started and stopped.

A still further object of this invention has been to produce a machine or apparatus which may be utilized for the manufacture of such pads or wrappers of different widths and lengths.

These and other objects, which will readily appear to one skilled in the art to which this invention belongs, I attain by means of the apparatus described in the specification and illustrated in the drawings.

The apparatus or machine may be driven from any suitable source of power at the desired speed, and will be supplied by any suitable means with excelsior or other fibrous material in quantities sufficient to insure a substantially continuous operation. The excelsior, by means not shown and not forming a part of this invention, is conveyed to the mouth of the machine and passes through a portion thereof wherein it is picked and continuously fed in graded and uniform quantity onto a continuously moving strip of paper which forms the envelop. This strip of paper carrying the quantity of picked excelsior, moves toward the outlet end of the machine, and the paper is turned over onto the top of the excelsior filling and has its edges pasted or glued together, and is cut off near the outlet end of the machine into suitable lengths by means of a cutting-off device automatically operated.

When wide pads are to be manufactured, or when it is desirable for commercial reasons to utilize narrow paper, the enveloping case may be formed of two pieces, one forming the bottom lapped over to form portions of the top, and one forming an inset between the overlapping edges of the under portion. When the inset is utilized there will be two lines of gluing either along each edge of the bottom portion or each edge of the inset.

Figure 2:
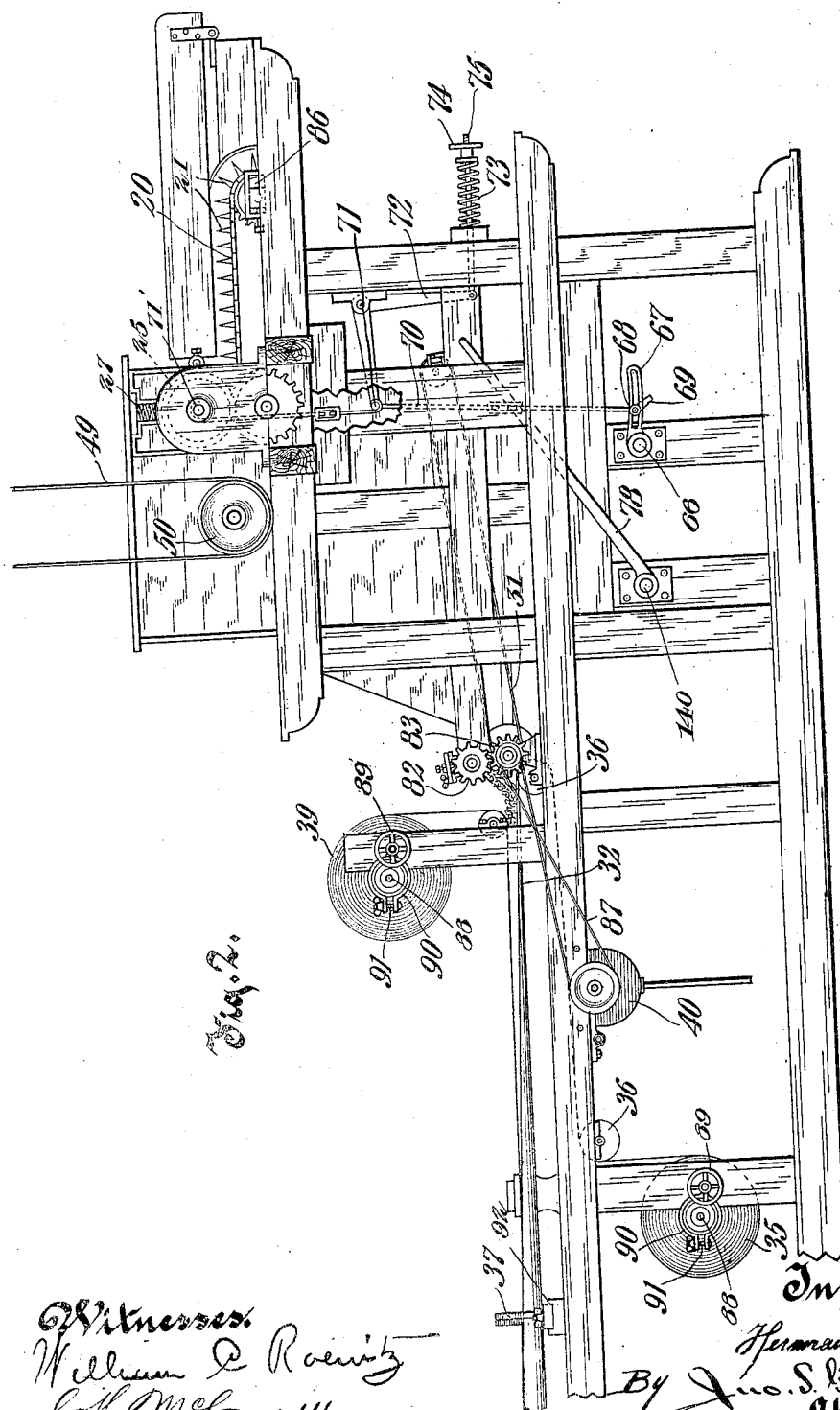
Figure 3:
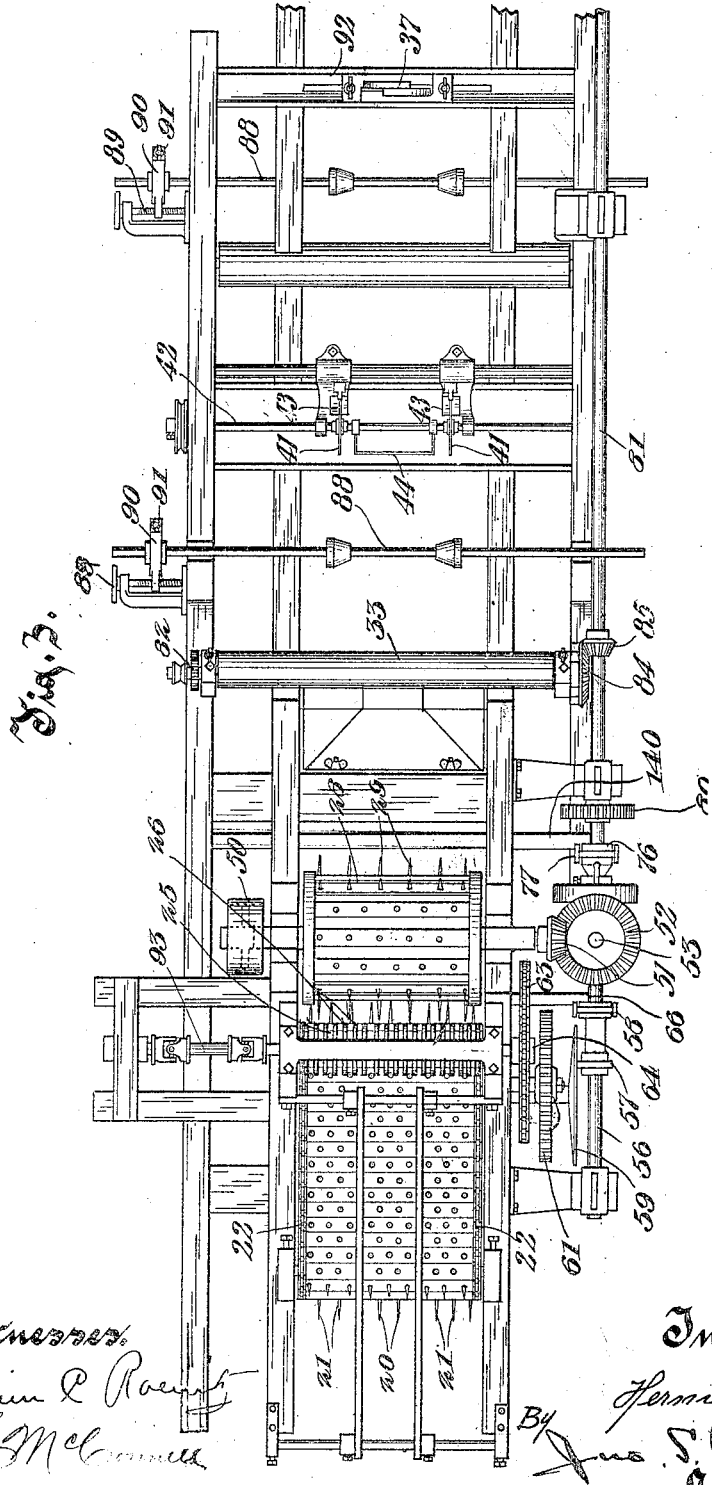
Figure 4:
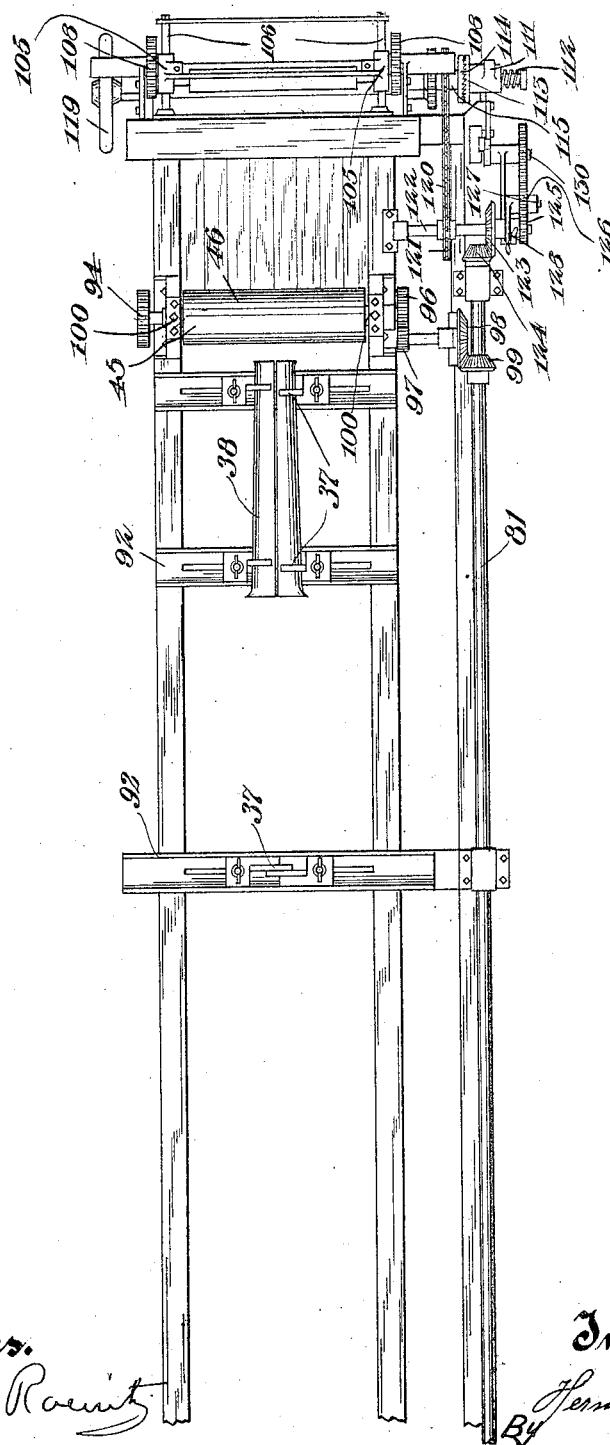
Figure 5:
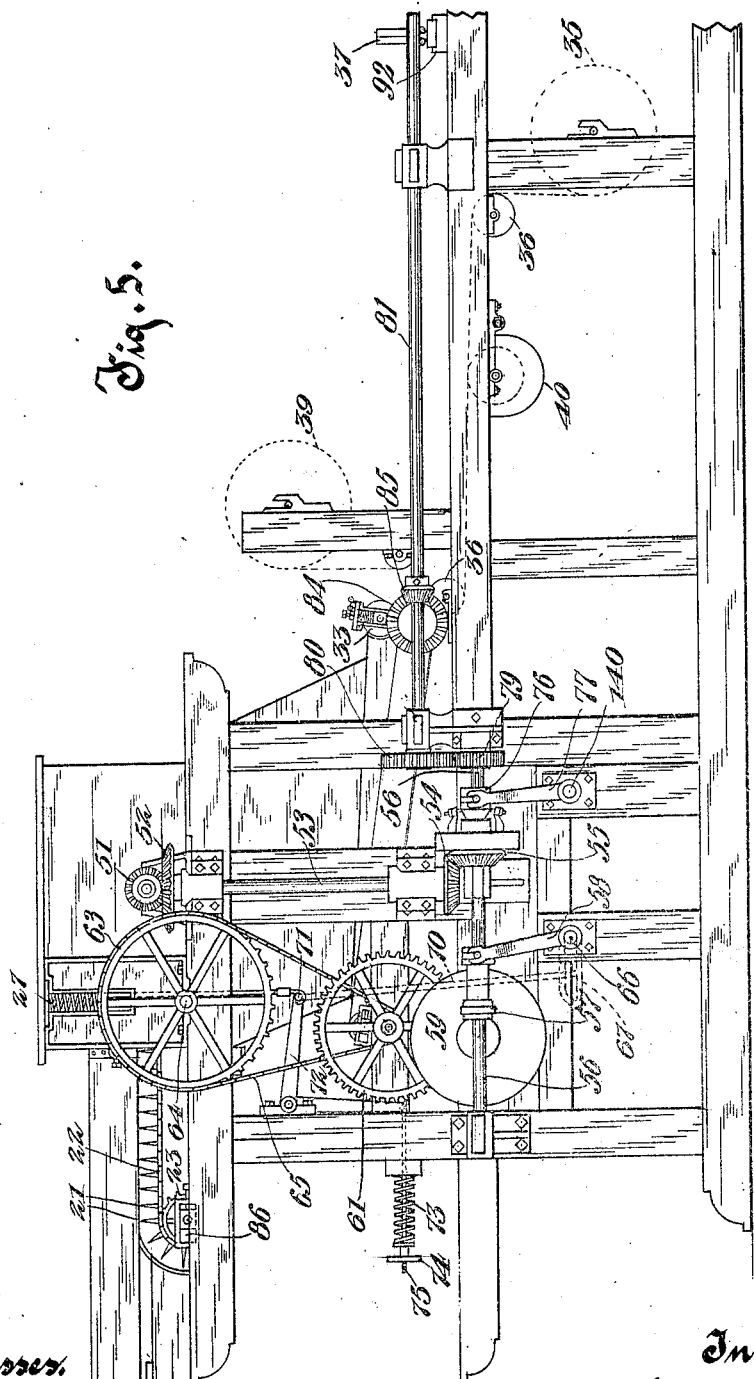
Figure 6:
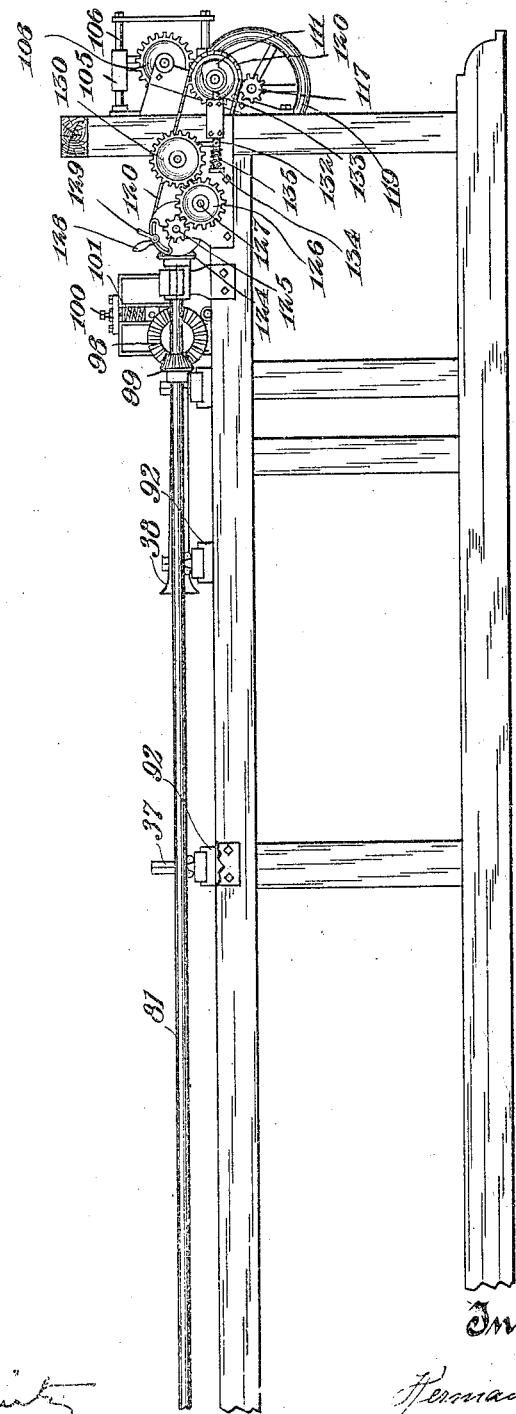
Figure 7:
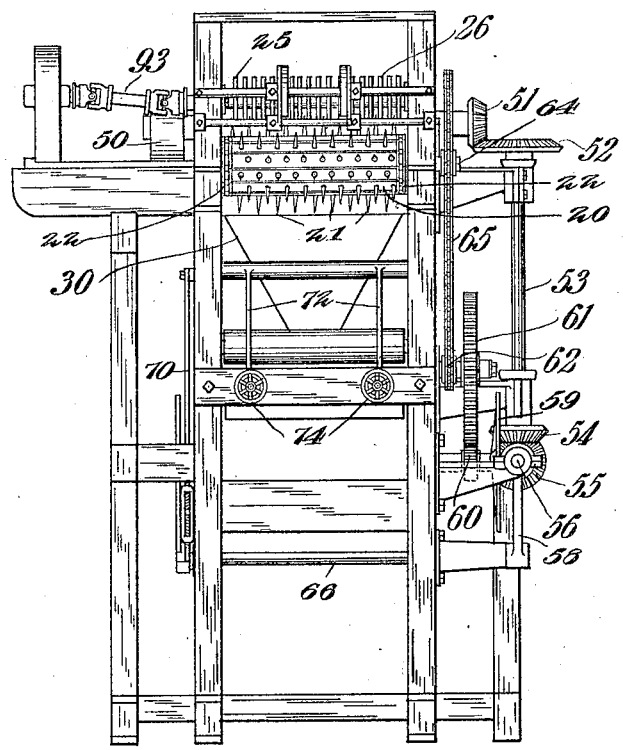
Figure 10:
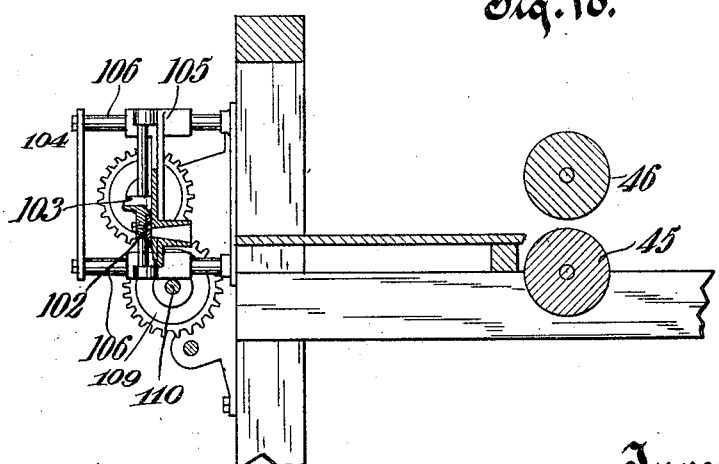
Figure 8:
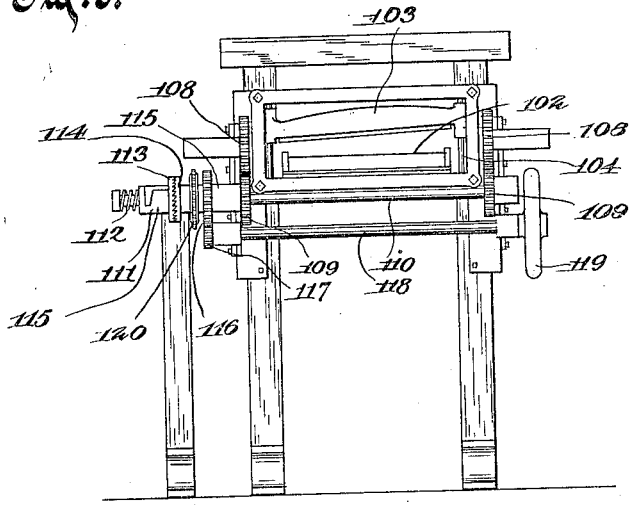
Figure 9:
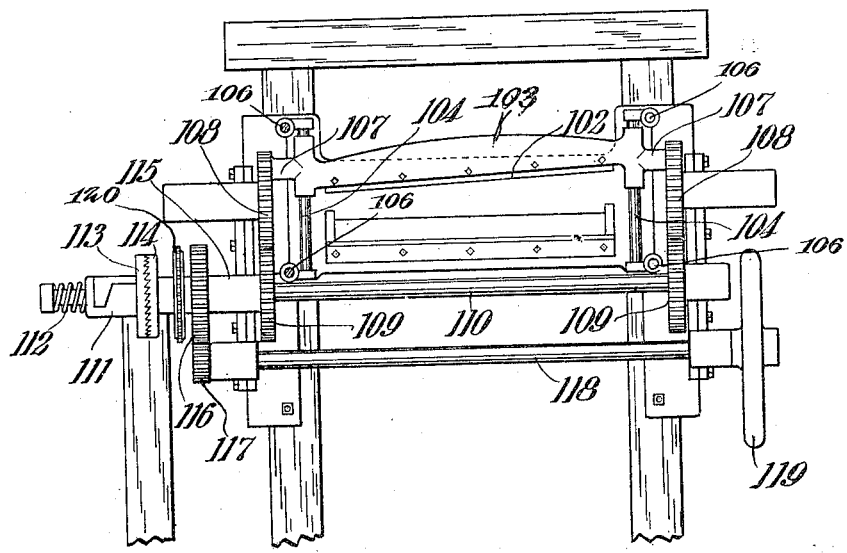

In the drawings throughout which corresponding elements are denoted by like characters, Figures 1 and 2 taken conjointly represent one side elevation of this apparatus: Figs. 3 and 4 taken conjointly represent a plan view of the same: Figs. 5 and 6 taken conjointly represent a side elevation taken from the side opposite to that from which Figs. 1 and 2 are taken: Fig. 7 is an end view in elevation of the apparatus and shows the inlet or feeding end or mouth: Fig. 8 is an end view in elevation of the outlet end of the apparatus at which the cutting-off mechanism is located: Fig. 9 is an enlarged view of the parts illustrated in Fig. 8, partially in section for the sake of illustration: Fig. 10 is a longitudinal sectional view of a portion of the cutting-off apparatus: Figs. 11 and 12 are respectively a side elevation and a plan view of the cutting off device and the means whereby the length of the pad or wrapper may be varied: Fig. 13 is a longitudinal section of the feeding end of the apparatus and illustrates the picker conveyer, the thickness grader, the picker cylinder, the feeding means from the picker cylinder to the moving paper strip, the roll of inset and the glue distributer: Figs. 14, 15, 16 and 17 illustrate cross sectional views of the pad as it appears at the several stages of folding during its progress through the apparatus: Fig. 18 is a view illustrating the lines of glue along the ends of the lower paper strip and the cross lines of glue hereinafter referred to: Figs. 19 and 20 are views in perspective of the two forms of finished pads.

The filling material, which, hereafter for the sake of brevity we will call excelsior, is fed onto a continuously moving conveyer 20 formed of plates extending laterally thereof and linked together in the nature of a chain and provided with outwardly extending teeth 21. The conveyer at each side carries a chain 22 whereby the conveyer is supported on and driven by suitable sprockets 23 and 24; the sprockets 24 being the driving sprockets while sprockets 23 are merely idlers. The excelsior by means of the teeth is carried forward and below a grading or retarding cylinder 25, formed of circular disks 26, suitably spaced apart and mounted on a driving shaft. The disks 26 lie between the rows of teeth 21 on the conveyer, and the cylinder 25 formed of the disks is yieldingly held toward the conveyer by means of springs 27. A picker cylinder 28, formed in any suitable manner and provided with picker teeth 29 fitting between the rows of the conveyer teeth, is mounted in front of the inner end of the conveyer and is driven at a high rate of speed. The excelsior which is carried by the conveyer past the grading cylinder 25 is picked or knocked from the conveyer teeth by the picker cylinder and falls through a hopper 30 onto a continuously moving belt carrier 31, by means of which it is conveyed forward and deposited onto the continuously moving paper strip 32. The side walls at the lower or discharge end of the hopper stand apart a distance corresponding to the width of the excelsior which it is desired to deposit on the paper. A roller 33, yieldingly supported above roller 34 carrying the endless conveyer 31, compresses the excelsior filling prior to its delivery onto the paper. The paper strip 32 derived from a roll 35 passes over idler rollers 36 and is pulled, by means hereinafter described, toward the discharging end of the apparatus. In its passage the paper is turned over or folded by means of a suitable number of formers 37 and finally through a compressing former tube 38.

In the drawings a roll of paper 39, from which the strip utilized as the upper inset is derived, is illustrated, but if it is desired to use but one strip of paper this may be omitted and the edges of the lower strip caused to overlap to form the envelop or casing. The paper carrying the excelsior from the delivery end of the hopper is drawn forward from the outlet end of the machine and serves as its own conveyer. The glue or paste contained in a suitable kettle or tank 40 located between the rollers 36 is distributed to the edges of the lower paper strip in its passage between the rollers 36 by means of two glue distributing disks 41 spaced the proper distance apart and carried on a shaft 42 driven at the proper speed. Suitable scraping devices 43 are employed for each glue distributing disk, and mounted upon the shaft 42 between the disks 41 is a glue distributing device 44. This glue distributing device 44 is formed in the nature of a bent wire and causes a line of glue to occur across or laterally of the lower paper strip once in every revolution of shaft 42, and this cross gluing is desirable when filling of short fiber is utilized, as it prevents the same from bunching in the wrapper and from falling out. The continuous length of glued and formed paper after passing through the compressing former tube 38 passes between two rollers 45 and 46 respectively. The upper of these rollers is yieldingly held toward the lower one by means of spring 101 and both are geared together and driven at the speed with which it is desired to have the strip of paper move, that is, the peripheral speed of the rollers will correspond to the speed of travel of the paper. The continuous length of finished pad after passing rollers 45 and 46 passes through a cutting-off device, hereinafter described, which during the cutting-off process advances in the direction of travel of the pad and at the same speed as the pad.

Power derived from any suitable source, such as an electric motor and transmitted through a belt 49 and pulley 50 mounted on the picker cylinder shaft drives the picker cylinder at the desired speed. The other end of the picker cylinder shaft carries a gear 51 meshing with the gear 52 carried on a vertical shaft 53, which at its lower end has a gear 54 in mesh with a gear 55 on a horizontally disposed shaft 56. The friction wheel 57 carried on a sleeve feathered on shaft 56 and shiftable thereon by means of a shifting lever 58, bears against the friction disk 59, the shaft of which carries a gear 60 in mesh with the gear 61. Passing over a sprocket 62, which is carried by the shaft which carries gear 61, and over a sprocket 63 which is mounted on a shaft 64 carrying the driving sprockets for the conveyer 20 is a driving chain 65. Through this chain of gears and the driving chain 65 the motion conveyed to the conveyer 20 is reduced to that desired, and further variations in the speed of the conveyer are obtained by means of the shifting lever 58, which lever is automatically shifted by means of the following mechanism:

The shifting lever 58 is carried on a rocker shaft 66 extending across the machine, and the other end of rock shaft 66 carries a lever arm 67 slotted to receive a pin 68 which, by means of a clamp 69 may be secured at any desired point of said lever.

Pivotally secured to pin 68 and provided with a turn-buckle take-up device is a connecting rod 70, an extension of which passes over the outer end 70' of the shaft which supports the grading cylinder 25. At 71 this connecting rod is pivotally secured to one arm of a bell crank lever 72, the lower arm of which is yieldingly held in position by means of a spring 73 and the tension of said spring, and therefore the position of the bell crank lever 72 is variable by means of a hand wheel 74 threaded onto a rod 75 passing through the spring and secured to said lever. From this it will be seen that as the position of the grading cylinder 25 changes against the stress of springs 27 and 73, the position of the friction wheel 57 in contact with friction disk 59 will be changed, and therefore the speed of the endless conveyer 20, whereby the thickness of the pad is regulated. The grading cylinder 25, through the agency of a suitable flexible shaft 93 and suitable gears (not shown), is driven by a gear (not shown) carried on the shaft of the member 24. The shaft 56 has one member 76 of a friction clutch device feathered to it and this member, through the agency of a shifting lever 77, which is mounted on a shaft 140, and a hand lever 78, mounted on the same shaft, is capable of being drawn into and out of clutching engagement with a clutch member 141, which is rotatably or loosely mounted on the shaft 56 and which carries the gear 55. When the member 76 is forced into clutching contact with the member 141, the shaft 56 is driven by the pulley 50 through the gears 51 and 52, the shaft 53, the gears 54 and 55, the member 141 and the member 76, which is feathered on the shaft. When the member 76 is drawn out of contact with the member 141, the member 141 and the gear 55 rotate freely on the shaft 56 and all the machine except the picker cylinder is stopped. Shaft 56 by means of gear 79 and 80 drives a shaft 81 which extends longitudinally of the machine from said gears to the discharging end or cutting-off device. Rollers 33 and 34 which are geared together at one end by means of gears 82 and 83 are driven at a peripheral speed equal to the speed of travel of the paper strip through the agency of gears 84 and 85 from shaft 81. The tension, or more properly the slack, in the endless conveyer 20 is taken up by means of a take-up device 86. The two glue distributing disks 41 are driven from a pulley on the shaft which carries roller 36 by means of a crossed belt 87.

The paper rolls 35 and 39 are carried between supporting cones on similar shafts 88. The centering or alinement of the rolls is accomplished by means of screw operated shifting devices 89 and the resistance to unwinding of the rolls in each case is secured by means of a friction band 90 surrounding a cylindrical member carried on the paper roll shaft, and the tension of the friction is regulable by means of a screw 91.

The guide or former arms 37 are mounted upon blocks which are slidable laterally within ways 92 extending across the machine, whereby the proper adjustment of said arms is attained and variable to suit different widths of pad manufactured. The former tube 38 is also adjustable laterally, and is held within former arms 37 adjustable as just described.

Rollers 45 and 46 which are geared together by means of gears 94 and 95 are driven at the peripheral speed with which it is desired to move the continuous length of pads through the apparatus and through the medium of suitable gears 96, 97, 98 and 99. The contact of the upper roller with the top of the continuous length of pad is regulable by means of a bolt 100 for varying the tension of springs 101 which yieldingly force the upper of said rollers downwardly.

The cutting-off device comprises a suitable knife 102 mounted in a knife carrier 103 vertically slidable on guide rods 104. The guide rods 104 are mounted in a frame 105 which is reciprocated on four guide rods 106. The frame 105, through means of cranks 107, is given its reciprocating motion longitudinally of the apparatus, and at the same time the knife carrier is reciprocated vertically of the machine. The cranks 107 are carried on the gears 108 which mesh with the gears 109. The gears 109 are carried on the shaft 110. Feathered to the end of shaft 110 is a cam 111 which is spring-held toward the knife by means of a spring 112. The inner end of cam member 111 carries one member 113 of a jaw clutch; the other member 114 of the jaw clutch is carried on a sleeve 115 loosely mounted on shaft 110; a gear wheel 116 meshing with the gear wheel 117 drives the shaft 118 carrying on one end thereof a fly-wheel 119, which may be of any diameter or width desired. Sleeve 115 by means of a suitable sprocket and chain 120 is continuously rotated through a sprocket 121 mounted on a short shaft 122 which carries a gear 123 in mesh with the gear 124 on driving shaft 81.

Carried on the outer end of shaft 122 is a gear 125 meshing with an intermediate gear 126 carried on a swinging stud 127. The stud 127 is mounted in a support 128, which swings about shaft 122 as a pivot, and by means of a locking device 129 may be locked in any desired position to mesh with the gear 130 carried on a short shaft journaled in suitable supports secured to the frame of the apparatus. The gear 130 is removably secured to its shaft and the arrangement is such that gears of different diameters may be utilized in place of it for the purpose of changing the time of the cutting operation of the knife so that pads or wrappers of different lengths are formed. The gear 126 is mounted on the swinging support 28 so that gears of different diameters may be used in place of 130.

Carried on the inner end of the shaft which carries gear 130 is a cam 131 and a pivoted lever 132 stands in the path of said cam. The lower end of lever 132 is pivotally connected to a pin 133 and surrounding said pin and between the lower end of lever 132 and a guide 134 secured to the frame of the apparatus is a spring 135 which tends to hold the upper part of lever 132 in contact with cam 131. When the lower part of lever 132 and the pin secured thereto is moved toward guide 134 by means of cam 131, the outer end of pin 133 is moved out of contact with cam 111, and the clutch member 113 is forced into contact with member 114 by means of spring 112. When the jaws 113 and 114 of the clutch are in contact one with the other the shaft 110 is positively driven through sprocket chain 120 and the knife is caused to operate to sever the desired length of pad from the continuous piece.

By varying the gear 130 it will be seen that the time of operation of the jaw clutch may be varied, and therefore the operation of the knife, and by this means the pads may be cut off in different lengths to suit requirements.

It will be understood that various changes in the construction of the apparatus may be made without departing from this invention.

Having thus described my invention, what I claim and desire to secure by Letters Patent is:—

1. In a pad forming machine, a rotatable picker cylinder, an endless toothed conveyer operating in conjunction with said picker cylinder, means for conveying the picked material onto a moving paper strip, a glue distributing roller contacting with said paper strip, and means for cutting off the finished pads.

2. In a pad forming machine, picker mechanism means for continuously moving a strip of paper through the machine, a conveyer for the filling material from the picker mechanism to the paper strip, a rotatable glue distributer, a vertically movable knife for severing the finished pad from said moving strip and means for moving said knife in the direction of travel of said strip during the cutting operation.

3. In a pad forming machine, picker mechanism means for continuously moving a strip of paper through the machine, a conveyer for the filling material from the picker mechanism to the paper strip, a rotatable glue distributer, a vertically movable knife for severing the finished pad from said moving strip, means for causing said knife during the cutting operation to travel with said strip, and agents whereby between the cutting operations said knife is retracted.

4. In a pad-forming machine, an endless fibrous material conveyer provided with fingers adapted to protrude into the mass of material, a regulating member above said conveyer and adjacent to the discharge point thereof, a picker cylinder adjacent to said member, an endless conveyer or apron for picked material, and mechanism for forming a case around the picked material.

5. In a pad-forming machine, a picker cylinder, an endless fibrous material feed apron provided with projecting fingers and a disked regulating member intermeshing with said fingers.

6. In a pad-forming machine, a rotatable picker cylinder, an endless conveyer provided with projecting fingers, and leading to said cylinder, for conveying fibrous material to said cylinder, a rotatable member yieldingly supported above said conveyer for holding the material in contact therewith while being picked, cover-forming mechanism, and means for conveying the picked material to said mechanism.

7. In a pad-forming machine, a feed belt for carrying fibrous material, fingers projecting from said belt into the material and rotatable means above said belt for yieldingly retarding the action of the belt.

8. In a pad-forming machine, a toothed carrying belt, a disked member coöperating therewith, a picker cylinder adjacent to the discharge point of the belt, and means for variably controlling the speed of said cylinder independently of the speed of the belt.

9. In a pad-forming machine, a carrying belt provided with projecting fingers, a yieldingly mounted disked drum coöperating therewith, a picker cylinder, and means for varying the speed of said cylinder and said belt independently.

10. In a pad-forming machine, a carding device comprising a rotatable yieldingly mounted disked member in an endless toothed belt, the teeth of which intermesh with the disks of said member, a rotatable picker, means for driving said picker independent of the belt, envelop-forming devices, and means for conveying carded material to said devices.

11. In a pad forming machine, in combination, a belt for conveying fibrous material, fingers projecting from said belt into said fibrous material, a picker cylinder coöperating therewith and means for varying the speed of said belt.

12. In a pad forming machine, in combination, a belt for carrying fibrous material, a picker cylinder coöperating with said belt and means, dependent on the amount of material carried by said belt, for governing the speed of the belt.

13. In a pad forming machine, in combination, a belt, a yieldingly supported regulating member coöperating therewith and means, dependent upon said regulating member, for governing the speed of said belt.

14. In a pad forming machine, in combination, a feed belt, a disked regulating member coöperating therewith and means, dependent on said regulating member, for governing the speed of said belt.

15. In a pad forming machine, in combination, a feed belt, fingers projecting therefrom, a disked regulating member coöperating with said belt and yieldingly held thereagainst, a picker cylinder receiving material delivered by said belt and means, dependent on said disked member, for regulating the speed of said belt.

16. In a pad forming machine, in combination, a toothed conveyer, a regulating member yieldingly coöperating therewith, a picker cylinder operating in conjunction with said conveyer and means for conveying the picked material onto moving strips of paper.

17. In a pad forming machine, in combination, a conveyer, a yieldingly reciprocable regulating member coöperating therewith, a picker cylinder operating in conjunction with said conveyer, means, dependent on said regulating member, for varying the speed of said conveyer and means for conveying the picked material to moving strips of paper.

18. In a pad forming machine, a conveyer, a spring-restrained regulating member coöperating therewith and means, dependent on the variations in position of said member, for varying the speed of said conveyer.

19. In a pad forming machine, in combination, a conveyer, a driving shaft for said conveyer, a variable speed mechanism between said driving shaft and said conveyer which comprises a friction disk and a coöperating friction wheel, a rotatable device yieldingly held against said conveyer and means operated by said device for shifting said wheel to vary the speed of said conveyer.

20. In a pad forming machine, a conveyer, a driving shaft therefor, a variable speed mechanism between said driving shaft and said conveyer comprising a friction disk and a coöperating friction wheel, a rotatable device coöperating with said conveyer and means actuated thereby for shifting said wheel to vary the speed of said conveyer.

21. In a pad forming machine, a conveyer, a driving shaft therefor, a variable speed mechanism between said driving shaft and said conveyer, a rotatable device coöperating with said conveyer and means actuated thereby for operating said variable speed mechanism to vary the speed of said conveyer.

22. In a pad forming machine, a conveyer, a picker cylinder coöperating therewith, a driving shaft for said conveyer and said picker cylinder, a speed change device between said driving shaft and said conveyer and means for varying the speed of said conveyer independently of the speed of the picker cylinder.

23. In a pad forming machine, a conveyer, a picker cylinder coöperating therewith, a driving shaft for said conveyer and said picker cylinder, a speed change device between said driving shaft and said conveyer and means for varying the speed of said conveyer.

24. In a pad forming machine, a conveyer, a cylinder coöperating therewith and means yieldingly held against said conveyer for governing the speed of said conveyer independently of the speed of said picker cylinder.

25. In a pad forming machine, in combination, a conveyer, a picker cylinder coöperating therewith, a driving shaft for said conveyer and said cylinder, a speed change device between said driving shaft and said conveyer and means for varying the speed of said conveyer independently of the speed of said picker cylinder.

26. In a pad forming machine, in combination, a conveyer for carrying fibrous material and rotatable means above said conveyer for governing the speed thereof.

27. In a pad forming machine, in combination, a rotatable picker cylinder, a conveyer for delivering material thereto, a yieldingly-supported member for holding the material in contact with said conveyer, cover-forming mechanisms and means for conveying picked material to said mechanisms.

28. In a pad forming machine, in combination, a continuously moving strip of paper, a conveyer delivering filling material to said strip, means for folding said strips to inclose said material to form a pad and a vertically-movable knife for severing the finished pad from said moving strips and means for moving said knife in the direction of travel of said strip during the cutting operation.

29. In a pad forming machine, in combination, a continuously moving strip of paper, a conveyer for delivering filling material to said strip, means for folding said strip to form a pad, a vertically-reciprocable knife for cutting off the finished pads and means for moving said knife in the direction of travel of the finished pad during the cutting operation.

30. In a pad forming machine, a filling material conveyer, a picker cylinder operating to receive the material from said conveyer, a driving shaft for said conveyer and said picker cylinder, a speed change device between said cylinder and said conveyer, means, comprising a rotatable cylinder, for varying the speed of said conveyer independently of the speed of said picker cylinder, means for continuously moving a strip of paper through the machine, means for conveying the picked filling material from said picker cylinder to the strip of paper, a rotatable glue distributer for distributing glue along the edges of the paper, means for folding said paper to inclose said filling material, means, comprising a vertically movable knife, for severing the finished pad from the moving strip, and means for moving said knife in the direction of travel of the strip during the cutting operation.

31. In a pad forming machine, a filling material conveyer, a rotatable picker cylinder operating to receive the material from said conveyer, a driving shaft for said conveyer and said picker cylinder, a speed changing device between said shaft and said conveyer, means, dependent on the amount of material carried by said conveyer, for varying the speed of said conveyer independently of the speed of the picker cylinder, means for continuously moving a strip of paper through the machine, means for conveying the picked filling material from said picker cylinder to the moving strip, a rotatable glue distributer for distributing glue along the edges of the moving strip, envelop forming devices for folding the paper to inclose the filling material, and means for severing the finished pad from the moving strip.

32. In a pad forming machine, a filling material conveyer, a picker cylinder operating in conjunction therewith, means dependent on the amount of material carried by said conveyer for varying the speed thereof independently of said picker cylinder, means for continuously moving a strip of paper through the machine, means for conveying picked material from said picker cylinder to said strip of paper, a rotatable glue distributing device for distributing glue along the edges of said strip and at intervals across said strip, means for folding the paper to inclose said material, rollers for compressing the formed pad, and means for severing the finished pad from the moving strip.

33. In a pad forming machine, a toothed filling material conveyer, a picker cylinder operating in conjunction therewith and receiving the material therefrom, a disked member yieldingly held toward said conveyer for varying the speed thereof independently of the speed of said picker cylinder, means for continuously moving a strip of paper through the machine, an endless conveyer for delivering the picked material from said picker cylinder to the moving strip, a rotatable glue distributing device for distributing glue along the edges of the strip and at intervals across the same, means for folding the paper to inclose the filling material, rollers for compressing the formed pad, and means for severing the finished pad from the moving strip.

34. In a pad forming machine, a toothed conveyer, a picker cylinder operating in conjunction therewith, means, held yieldingly toward said conveyer, for varying the speed thereof independently of the speed of said picker cylinder, means for continuously moving a strip of paper through the machine, an endless conveyer for delivering filling material from said picker cylinder to said strip, a rotatable glue distributer for delivering glue along the edges of the strip and at intervals across the same, means for folding the paper to inclose the filling material, and means for severing the finished pad from the moving strip.

35. In a pad forming machine, a filling material conveyer, a picker cylinder operating in conjunction therewith, means for varying the speed of said conveyer independently of the speed of said cylinder, means for continuously moving a strip of paper through the machine, means for conveying said picked material from said picker cylinder to said moving strip, a rotatable glue distributer for distributing glue upon the strip, means for folding the paper to inclose said material and for compressing the same, and means for severing the finished pad from the moving strip.

36. In a pad forming machine, an endless conveyer, a regulating member above said conveyer and adjacent to the discharge point thereof, a picker cylinder adjacent to said member, means for continuously moving a strip of paper through the machine, an endless belt for delivering the picked material from said cylinder to said moving strip, means for distributing glue along the strip of paper, means for folding the paper to inclose the picked material, and means for severing the finished pads from the moving strip.

In testimony whereof, I have hereunto subscribed my name this 20th day of December, 1904.

HERMAN HAYSSEN.

Witnesses:
FRANK J. KELI,
A. L. TREICK.